United States Patent
Kraft (10) Patent No.: US 10,773,462 B2
(45) Date of Patent: Sep. 15, 2020

(54) METHOD OF MANUFACTURING CONTOURED OBJECTS BY RADIO FREQUENCY WELDING AND TOOLING ASSEMBLY FOR SAME

(71) Applicant: NIKE, Inc., Beaverton, OR (US)

(72) Inventor: Bryan Kraft, Albany, OR (US)

(73) Assignee: NIKE, Inc., Beaverton, OR (US)

( * ) Notice: Subject to any disclaimer, the term of this patent is extended or adjusted under 35 U.S.C. 154(b) by 209 days.

(21) Appl. No.: 15/946,262

(22) Filed: Apr. 5, 2018

(65) Prior Publication Data
US 2018/0222121 A1 Aug. 9, 2018

Related U.S. Application Data

(62) Division of application No. 14/285,844, filed on May 23, 2014, now Pat. No. 10,005,231.

(51) Int. Cl.
*B29D 35/12* (2010.01)
*B29C 65/04* (2006.01)
(Continued)

(52) U.S. Cl.
CPC .............. *B29C 65/04* (2013.01); *A43B 7/144* (2013.01); *A43B 13/20* (2013.01); *B29C 65/7841* (2013.01); *B29C 66/1122* (2013.01); *B29C 66/301* (2013.01); *B29C 66/3494* (2013.01); *B29C 66/433* (2013.01); *B29C 66/474* (2013.01); *B29C 66/532* (2013.01); *B29C 66/7234* (2013.01); *B29C 66/73143* (2013.01); *B29C 66/8124* (2013.01); *B29C 66/81241* (2013.01); *B29C 66/81422* (2013.01); *B29C 66/81423* (2013.01); *B29C 66/81451* (2013.01); *B29C 66/81457* (2013.01); *B29C 66/8242* (2013.01); *B29C 66/8322* (2013.01); *B29D 35/142* (2013.01); *B29C 66/71* (2013.01); *B29C 66/81263* (2013.01); *B29C 66/83221* (2013.01); *B29K 2023/086* (2013.01); *B29K 2071/00* (2013.01); *B29K 2075/00* (2013.01); *B29K 2995/0006* (2013.01); *B29L 2031/504* (2013.01); *B29L 2031/505* (2013.01); *Y10T 156/1028* (2015.01)

(58) Field of Classification Search
CPC .......... H05B 6/54; B29C 65/04; A43D 25/20; A43D 25/06; A43D 25/07; B29D 35/142; B29D 35/085; B29D 35/63
See application file for complete search history.

(56) References Cited

U.S. PATENT DOCUMENTS 2,623,984 A * 12/1952 Ashley ................ B29C 66/8126
219/766
4,024,038 A * 5/1977 Luc ........................ B29C 59/00
204/168

FOREIGN PATENT DOCUMENTS

KR 1020020026185 A 4/2002

* cited by examiner

*Primary Examiner* — Jeffry H Aftergut
(74) *Attorney, Agent, or Firm* — Quinn IP Law

(57) ABSTRACT

A method includes compressing a non-dielectric, elastically-deformable component, a wire mesh component, and a dielectric, contoured object between first and second forming tools. Once the components are compressed, radio frequency energy is supplied to the first forming tool, thereby causing a radio frequency electromagnetic field to be generated between the first forming tool and the wire mesh component that results in a contoured weld of the contoured object. A tooling assembly is configured to carry out the method.

11 Claims, 5 Drawing Sheets

(51) Int. Cl.
  *B29D 35/14*   (2010.01)
  *B29C 65/78*   (2006.01)
  *B29C 65/00*   (2006.01)
  *A43B 7/14*    (2006.01)
  *A43B 13/20*   (2006.01)
  *B29K 75/00*   (2006.01)
  *B29L 31/50*   (2006.01)
  *B29K 23/00*   (2006.01)
  *B29K 71/00*   (2006.01)

METHOD OF MANUFACTURING CONTOURED OBJECTS BY RADIO FREQUENCY WELDING AND TOOLING ASSEMBLY FOR SAME

CROSS-REFERENCE TO RELATED APPLICATION

This application is a divisional application of and claims the benefit of priority to U.S. application Ser. No. 14/285,844 filed on May 23, 2014, which is hereby incorporated by reference in its entirety.

TECHNICAL FIELD

The present teachings generally include a method of manufacturing contoured objects by radio frequency welding and a tooling assembly for carrying out the method.

BACKGROUND

Radio frequency welding is a process used to join dielectric components to one another by pressing the components to one another between electrodes. Radio frequency energy is supplied, causing the electrode to create an electromagnetic field at the surfaces of the components to be joined. Because the material or materials of the components are dielectric, the electromagnetic field excites the material, heating it from within and fusing the surfaces of the components to one another at a seamless bond or weld as strong as the joined materials.

Radio frequency welding is typically carried out between top and bottom forming tools configured to apply pressure to the components to be joined. When the components have complex, contoured outer surfaces, it can be difficult to ensure that the tooling reliably applies sufficient pressure to the components in all of the areas required to ensure optimum welds. Accordingly, dedicated tooling with custom mold cavities is sometimes used to ensure that the tooling conforms to and supports the outer surfaces of the components to be joined. Alternatively, a series of shims can be fit between flat tooling and the components to be joined to more closely conform to the contoured outer surfaces of the components. These options may be relatively costly and may slow manufacturing time, as a particular arrangement of the components in the tooling cavities or of the shims may be necessary.

SUMMARY

A method of manufacturing by radio frequency welding of dielectric, contoured objects is provided, along with an assembly for radio frequency welding of such objects. Relatively simple tooling components are used, and the tooling need not be customized for specific contoured objects. More specifically "soft" or "flexible" tooling enables consistent pressure application and magnetic energy generation even on components with complex, three-dimensional outer surfaces. Accordingly, even contoured welds of the components are enabled.

The method includes compressing a non-dielectric, elastically-deformable component, a wire mesh component, and a dielectric, contoured object between first and second forming tools. For example, the non-dielectric, elastically-deformable component may be polymeric foam, foamed rubber, butyl rubber, or other suitable materials. The contoured object is positioned between the first forming tool and the wire mesh component during compressing, and the elastically-deformable component is between the wire mesh component and the second forming tool.

The compressing is done with sufficient pressure such that the elastically-deformable component elastically deforms and presses the flexible wire mesh component against a contoured surface of the contoured object. In other words, the elastically-deformable component and the flexible wire mesh component are compressed between the second forming tool and the contoured object, causing the elastically-deformable component to compress more in some areas than in others to fill in the irregular spaces between the second forming tool and the outer surface of the contoured object. The flexible wire mesh component is thus biased against the outer surface of the contoured object.

Once the components are compressed, the method proceeds by supplying radio frequency energy to the first forming tool, thereby causing a radio frequency electromagnetic field to be generated between the first forming tool and the wire mesh component that results in a contoured weld of the contoured object. The wire mesh component and the elastically-deformable component effectively serve as "soft tooling" to extend the second forming tool to the contoured object. This enables the radio frequency energy to be more evenly applied to the contoured object, including at contoured surfaces thereof, to create desired welds. With radio frequency welding, heat is generated only when the radio frequency energy is supplied, and is localized at the weld. The entire object to be welded is not heated, as it may be with other types of welding that require the tooling to be heated.

An assembly for radio frequency welding of a dielectric, contoured object includes a first forming tool and a second forming tool at least one of which is configured to be movable toward and away from the other. The assembly further includes a non-dielectric, elastically-deformable component supported on the second forming tool, and a wire mesh component supported on the non-dielectric, elastically-deformable component. The first forming tool and the wire mesh component are configured to transmit radio frequency energy to a dielectric, contoured object compressed between the first forming tool and the wire mesh component by movement of said at least one of the forming tools toward the other forming tool, and by the elastically-deformable component elastically deforming to distribute pressure of the forming tools on the wire mesh component. This causes the wire mesh component to flex and be pressed against the dielectric, contoured object.

The method and tooling assembly enable relatively non-complex forming tools to be used to provide reliable welds of contoured objects using radio frequency welding. In fact, existing tooling assemblies may be adapted to perform the method with the addition of one or more wire mesh components and one or more non-dielectric, elastically-deformable components. The use of radio frequency welding may be preferred in some applications as an alternative to the use of welding processes that require adhesives or solvents.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items.

Those having ordinary skill in the art will recognize that terms such as "above," "below," "upward," "downward," "top," "bottom," etc., are used descriptively for the figures, and do not represent limitations on the scope of the invention, as defined by the claims.

The above features and advantages and other features and advantages of the present teachings are readily apparent from the following detailed description of the best modes for carrying out the present teachings when taken in connection with the accompanying drawings.

DETAILED DESCRIPTION

Figure 1:
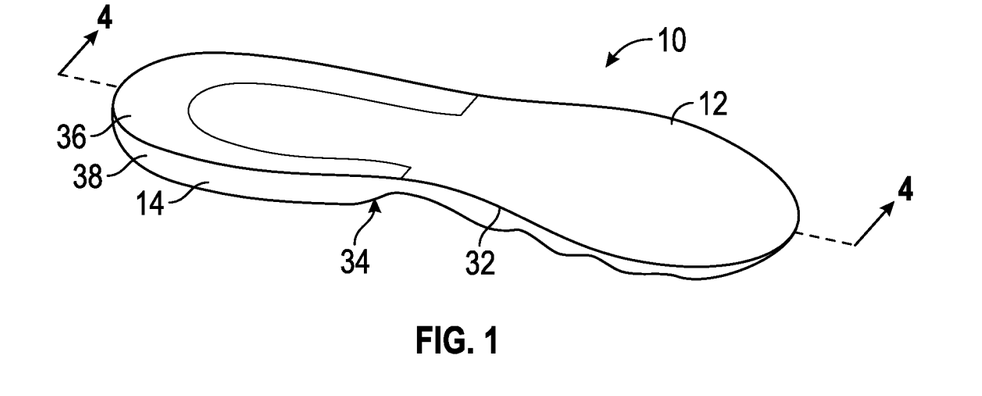
FIG. 1 is a schematic perspective illustration of a bladder element for an article of footwear.

Referring to the drawings, wherein like reference numbers refer to like components throughout the several views, FIG. 1 shows a bladder element 10 as used in a midsole of an article of footwear. The bladder element 10 has a first or upper polymeric sheet 12, and a second or lower polymeric sheet 14.

Figure 4:
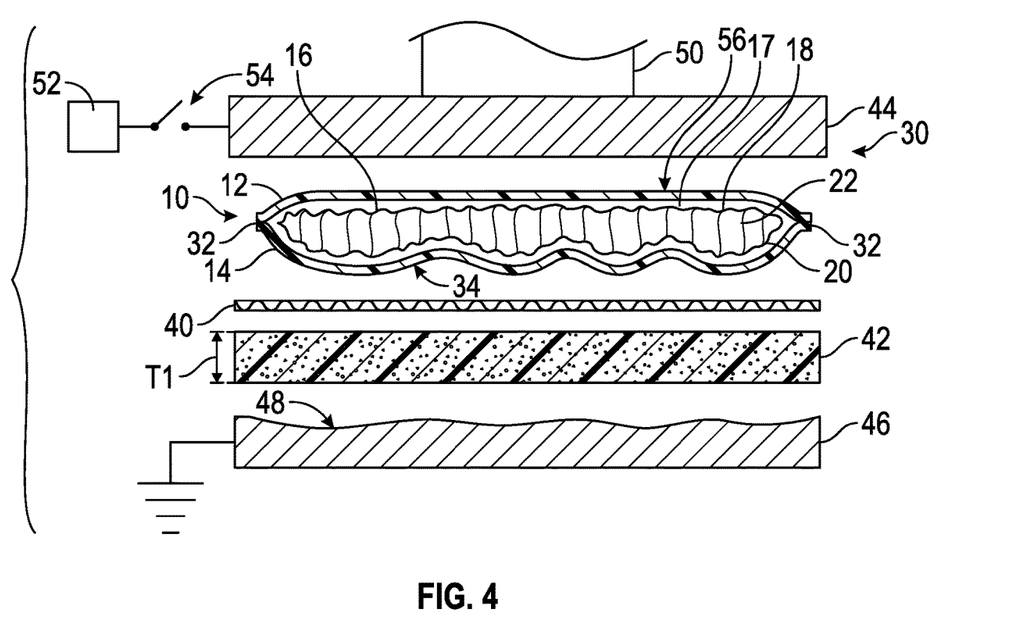
FIG. 4 is a schematic illustration in cross-sectional exploded view of a tooling assembly for radio frequency welding, including the wire mesh screen of FIG. 2 and non-dielectric elastically-deformable component of FIG. 3, and showing the bladder element of FIG. 1 taken at lines 4-4 in FIG. 1.
Figure 5:
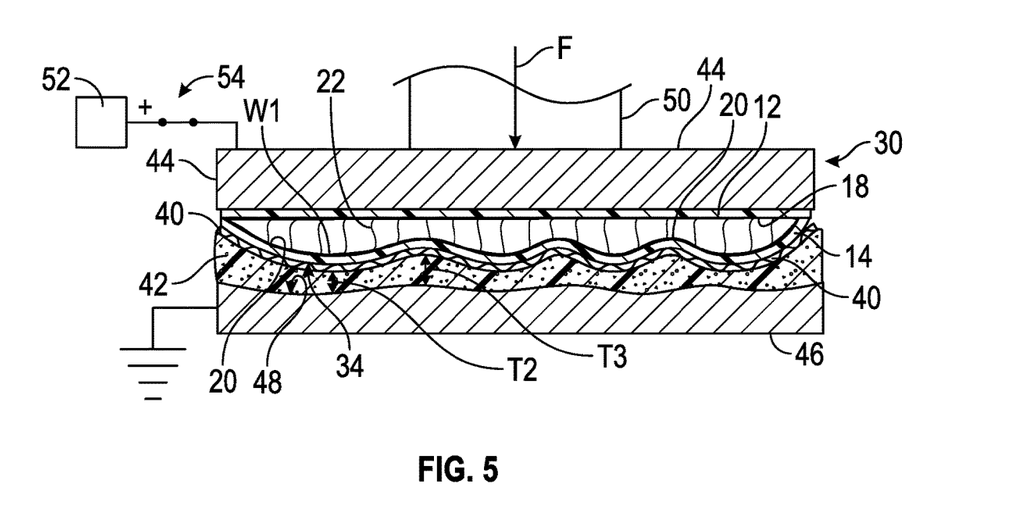
FIG. 5 is a schematic cross-sectional illustration of the tooling assembly of FIG. 4 welding the bladder element of FIG. 1.

A multi-dimensional fabric tensile element 16 is positioned in the internal cavity 17 formed between the upper and lower sheets 12, 14, as shown in FIGS. 4 and 5. The tensile element 16 has a first inner sheet 18 and a second inner sheet 20, interconnected by a plurality of tensile members 22. In the completed bladder element 10, the inner sheet 18 is welded to the upper sheet 12, and the inner sheet 20 is welded to the lower sheet 14, as shown in FIG. 5. The tensile members 22 are thus operatively connected to the upper and lower sheets 12, 14 once welding has occurred. FIG. 4 shows the tensile element 16 prior to welding.

The bladder element 10 is a non-limiting example of an arrangement of the tensile element 16. In other embodiments, the bladder element 10 may have no tensile element. In still other embodiments, the tensile element 16 can have other configurations with only selected portions of the tensile element 16 welded to the upper or lower sheets 12, 14 to enable a desired three-dimensional configuration. A plurality of bladder elements with various tensile element configurations are shown and described in U.S. Pat. No. 5,802,739, issued to Potter et al., which is hereby incorporated by reference in its entirety. Tensile members and/or reinforcing structures can be integrated with the bladder element 10 to provide desired responsiveness, such as disclosed in U.S. Pat. No. 4,906,502 to Rudy et al., and U.S. Pat. No. 8,061,060 to Swigart et al., which are incorporated by reference in their entireties.

The bladder element 10 can be formed from a variety of materials including various polymers that can resiliently retain a fluid such as air or another gas. Examples of polymer materials for the bladder element 10 include thermoplastic urethane, polyurethane, polyester, polyester polyurethane, and polyether polyurethane. Moreover, the bladder element 10 can be formed of layers of different materials. In one embodiment, the bladder element 10 is formed from thin films having one or more thermoplastic polyurethane (TPU) layers with one or more barrier layers of a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. Bladder element 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 10 may also be a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Additional suitable materials for the bladder element 10 are disclosed in U.S. Pat. Nos. 4,183,156 and 4,219,945 to Rudy, which are incorporated by reference in their entireties. Further suitable materials for the bladder element 16 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 10, engineering properties such as tensile strength, stretch properties, fatigue characteristics, dynamic modulus, and loss tangent can be considered. The thicknesses of sheets of materials used to form the bladder element 10 can be selected to provide these characteristics. The bladder element 10 is resilient and provides cushioning and flexibility that can be tuned such as by selecting a level of pressurization. Tensile members and/or reinforcing structures can be integrated with the bladder element 16 to provide desired responsiveness, such as disclosed in U.S. Pat. No. 4,906,502 to Rudy et al., and U.S. Pat. No. 8,061,060 to Swigart et al., which are incorporated by reference in their entireties.

Welding of the tensile element 16 to the first and second sheets 18, 20 is one example of a contoured weld required for a contoured object (i.e., the bladder element 10). The tooling assembly 30 shown and described in FIGS. 4 and 5, and the method of manufacturing 100 of FIG. 6 can be used to provide such a contoured weld in an efficient and reliable manner. The upper and lower sheets 12, 14 are welded together at a peripheral flange 32, shown in FIGS. 1 and 4, prior to radio frequency welding of the tensile element 16 to the upper and lower sheets 12, 14. As can be seen in FIGS. 1 and 4, the lower sheet 14 has a contoured outer surface 34. A heel region 36 in particular has a relatively large cushioning portion 38. In both FIGS. 1 and 4, the bladder element 10 is shown prior to inflation of the bladder element 10 by adding air or another gas to the internal cavity. Accordingly, the contoured outer surface 34 is a result of thermoforming the upper and lower sheets 12, 14, and exists even prior to final inflation of the bladder element 10.

The tooling assembly 30 is configured to enable radio frequency welding of contoured objects such as the bladder element 10 by utilizing components that easily and reliably conform to the contoured outer surface 34. The tooling assembly 30 includes at least one wire mesh screen 40, shown in FIG. 2, and at least one non-dielectric, elastically-deformable component 42, shown in FIG. 3. Although only one wire mesh screen 40 is used in the embodiment of FIG. 2, multiple wire mesh screens could be used. The wire mesh screen 40 and non-dielectric, elastically-deformable component 42 are relatively soft tooling used in conjunction with more rigid first and second forming tools 44, 46 of the tooling assembly 30 to enable a unique and reliable radio-frequency welding process described herein.

Figure 2:
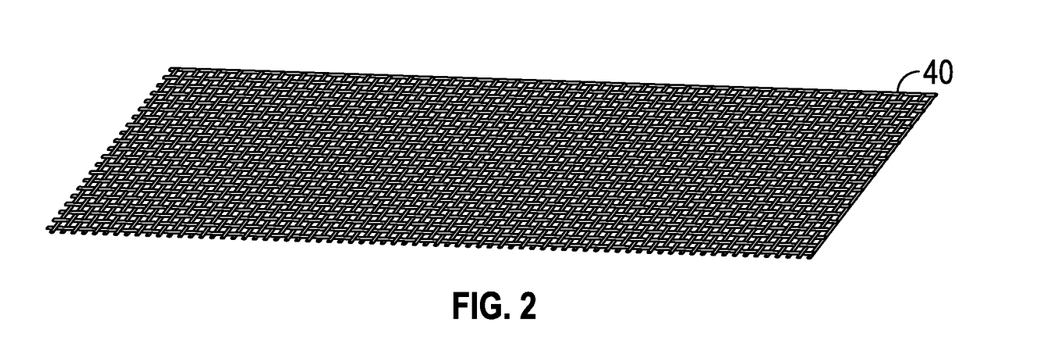
FIG. 2 is a schematic perspective illustration of a wire mesh screen.

The wire mesh screen 40 can be any of a variety of materials capable of cooperating with the first forming tool 44 in causing an alternating magnetic field within the bladder element 10 when radio frequency energy is supplied to the first forming tool 44, which functions as an electrode. For example, the wire mesh screen 40 can be bronze, brass, copper, stainless steel, or alloys of any of these materials. Additionally, a range of mesh sizes for the wire mesh screen 40 may be suitable. For example, wire mesh screens 40 with 120 by 120 wires per square inch mesh and with 500 by 500 wires per square inch mesh have been determined to be suitable. The wire mesh 40 screen may have mesh sizes smaller or larger than these sizes, however. As shown in FIGS. 2 and 4, the wire mesh screen 40 is generally flat when not subjected to compression between the forming tools 44, 46. The wire mesh screen 40 is configured with a wire thickness and mesh that enables the wire mesh screen 40 to easily flex to conform to the contoured outer surface 34 of the bladder element 10 when subjected to compression between the forming tools 44, 46, however.

Figure 3:
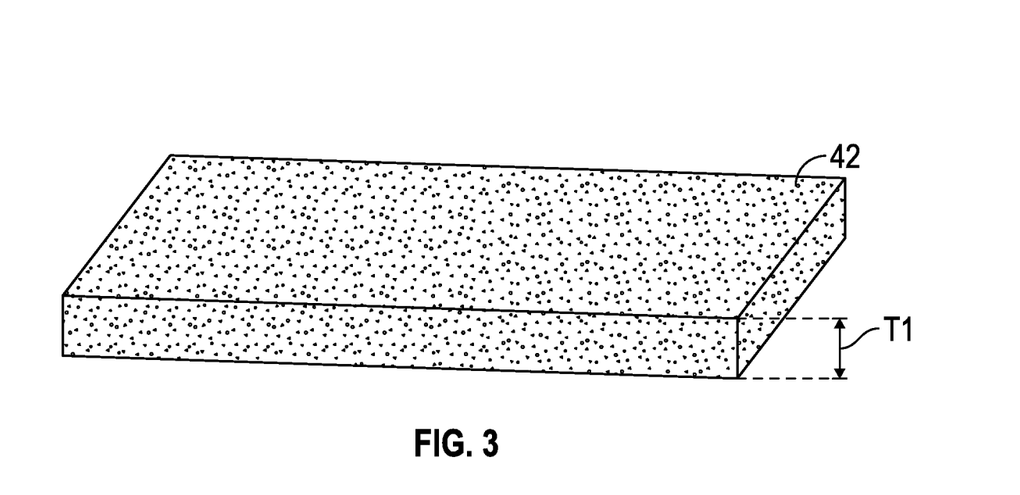
FIG. 3 is a schematic perspective illustration of a non-dielectric elastically-deformable component.

The non-dielectric, elastically-deformable component 42 of FIG. 3 is of a material that is elastically and resiliently deformable. In other words, the component 42 has a compliance when subjected to compression by the forming tools 44, 46 that enables it to conform to the upper surface 48 of the lower forming tool 46, and to press the wire mesh component 40 against the contoured outer surface 34 of the bladder element 10, while occupying the irregular volume between the wire mesh component 40 and the upper surface 48, as shown in FIG. 5. The upper surface 48 of the lower forming tool 46 has some contoured areas generally corresponding with the contoured outer surface 34 of the bladder element 10. The contours of the forming tool 46 are not as severe as those of the bladder element 10, however, as the component 42 accommodates the differences in topography of the surfaces 48, 34. In fact, the surface 48 of the lower forming tool 46 could be completely flat. Although only one non-dielectric, elastically-deformable component 42 is shown in the embodiment of FIG. 3, multiple adjacent non-dielectric, elastically-deformable components 42 could instead be used.

The component 42 can be a generally rectangular shape when not compressed, as shown in FIG. 3, with a substantially uniform thickness T1. The thickness T1 is chosen so that the component 42 will be compressed over its entire contact area with the second forming tool 46 and the wire mesh 40. For example, some portions of the component 42 will be compressed to a thickness T2, and others will be compressed to an even larger thickness T3, both of which are less than the uncompressed thickness T1.

When compressed, the material of the component 42 is such that the component 42 exerts a biasing force acting against the compressing forces as the component 42 is resiliently biased to its original shape and thickness T1. Suitable materials for the component 42 include but are not limited to polymeric foam, rubber, foamed rubber, and silicone butyl rubber. These suitable materials are non-dielectric, enabling the component 42 to insulate the second forming tool 46 from the effect of the radio frequency energy supplied to the first forming tool 44. Accordingly, the component 42 not only serves to force the wire mesh screen 40 to conform to the contoured outer surface 34 of the bladder element 10, but also ensures that the wire mesh component 40 will serve as the component that pairs with the first forming tool 44 to generate the alternating magnetic field within the material of the bladder element 10.

FIG. 5 shows the first forming tool 44 moved closer to the second forming tool 46, such as by application of pressure, including but not limited to pneumatic or hydraulic pressure through a piston 50, resulting in force F, as will be understood by those skilled in the art. The first forming tool 44 is thus operable to move toward and away from the second forming tool 46. The second forming tool 46 may be fixed such that it is stationary. In other embodiments, both forming tools 44, 46 may be configured to move toward and away from one another, or the piston 50 could be connected to the second forming tool 46, and only the second forming tool 46 may be configured to move toward and away from the first forming tool 44.

The first forming tool 44 is operatively connected to a power source 52 that supplies radio frequency energy to the first forming tool 44, such as when a switch 54 is closed. The first forming tool 44 is electrically conductive, such as a ferromagnetic material. The first forming tool 44 contacts the upper surface 56 of the first sheet 12 and the wire mesh tool 40 conforms to and is in contact with the contoured surface 34 of the second sheet 14 as discussed herein.

The radio frequency energy creates an alternating magnetic field between the first forming tool 44 and the wire mesh component 40 and is therefore within the bladder element 10. The alternating magnetic field excites the dielectric material of the sheets 12, 14, fusing them to the first and second inner sheets 18, 20 of the tensile element 16. Because the entire upper surface of the first sheet 12 is in contact with the first forming tool 44, and the contoured lower surface 34 of the second sheet 14 is in contact with the wire mesh component 40, the entire outer surfaces of the inner sheets 18, 20 are welded to the inner surfaces of the sheets 12, 14, including a portion that is a contoured weld W1. The weld W1 is of a first portion of the bladder element 10 (i.e., the tensile element 16) to a second portion of the bladder element 10 (i.e., the sheet 14). Welds such as weld W1 created by radio frequency energy heat the material, causing it to intermingle, fusing the material of the two components welded to one another and as such are as strong as either of the materials.

Figure 6:
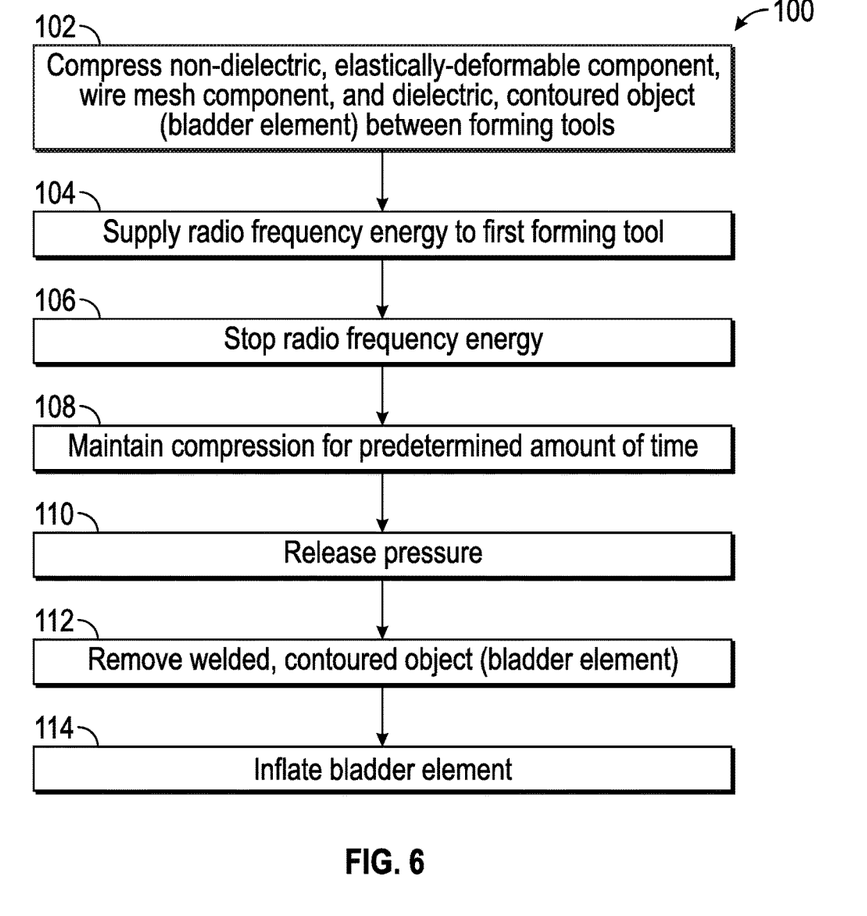
FIG. 6 is a flow diagram of a method of manufacturing the bladder element of FIG. 1 using the tooling assembly of FIGS. 4-5.

The flow diagram of FIG. 6 illustrates a method 100 of manufacturing components, such as the bladder element 10 for an article of footwear. The method 100 may begin with step 102, compressing a non-dielectric, elastically-deformable component 42, a wire mesh component 40, and a dielectric, contoured object (bladder element 10) between first and second forming tools 44, 46. The method 100 then proceeds to step 104, supplying radio frequency energy to the first forming tool 44, thereby causing a radio frequency electromagnetic field between the first forming tool 44 and the wire mesh component 40 that results in a contoured weld W1 of the bladder element 10. After a predetermined amount of time, or when some other predetermined parameter has been achieved, the method 100 moves to step 106 and the radio frequency energy is stopped, or, in other words, is no longer supplied to the first forming tool 44, such as by opening switch 54.

When the radio frequency energy is stopped, the compression of the non-dielectric, elastically-deformable component 42, the wire mesh component 40, and the dielectric, contoured object (bladder element 10) is maintained by the first and second forming tools 44, 46 for at least a predetermined amount of time in step 108. During this time, the bladder element 10 cools, and pressure is released in step 110, allowing the first forming tool 44 to be moved away from the second forming tool 46. The welded contoured object, i.e., bladder element 10, is then removed from between the forming tools 44, 46 in step 112. The bladder element 10 is inflated in step 114. Inflation may occur prior to or after removal in step 112.

Figure 7:
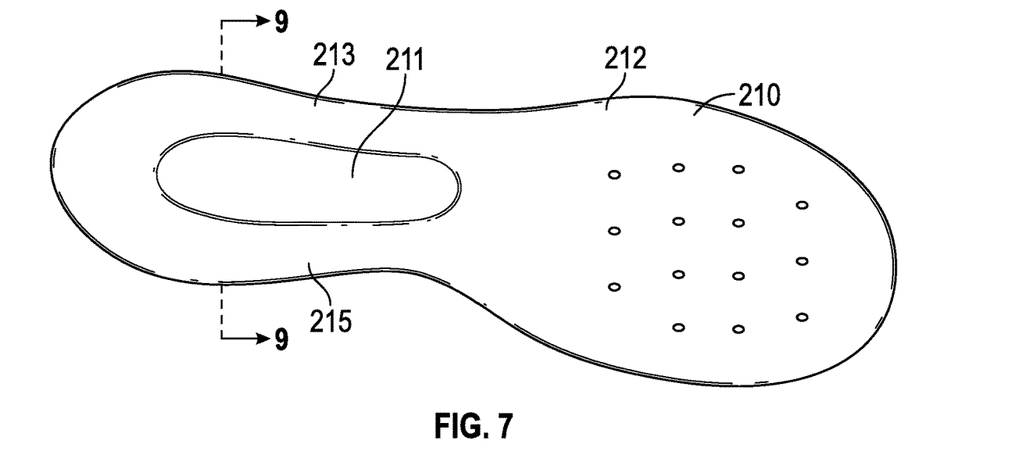
FIG. 7 is a schematic plan view illustration of another embodiment of a bladder element for an article of footwear.
Figure 8:
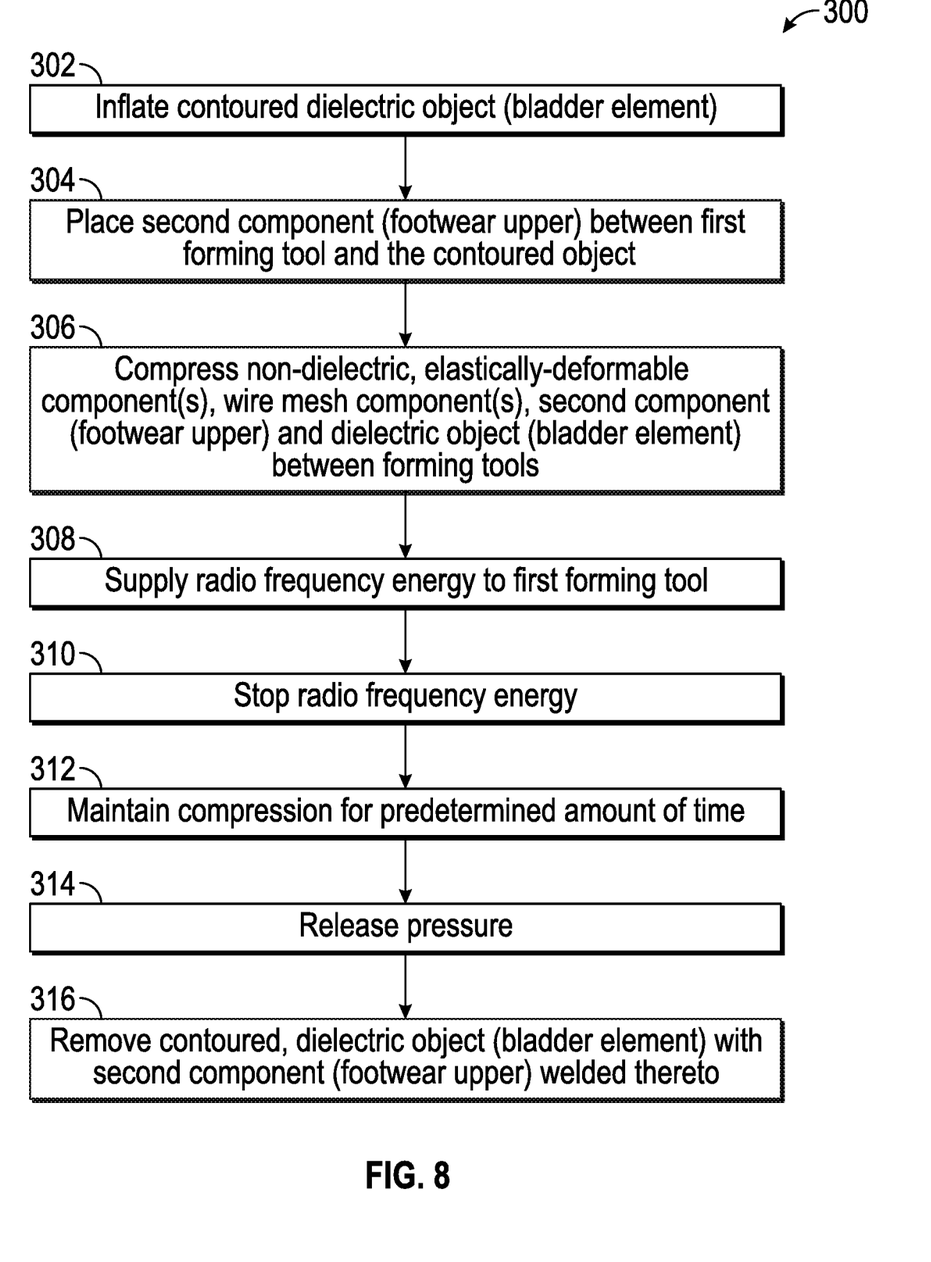
FIG. 8 is a flow diagram of a method of manufacturing the bladder element of FIG. 7 using the tooling assembly of FIGS. 9-10.
Figure 9:
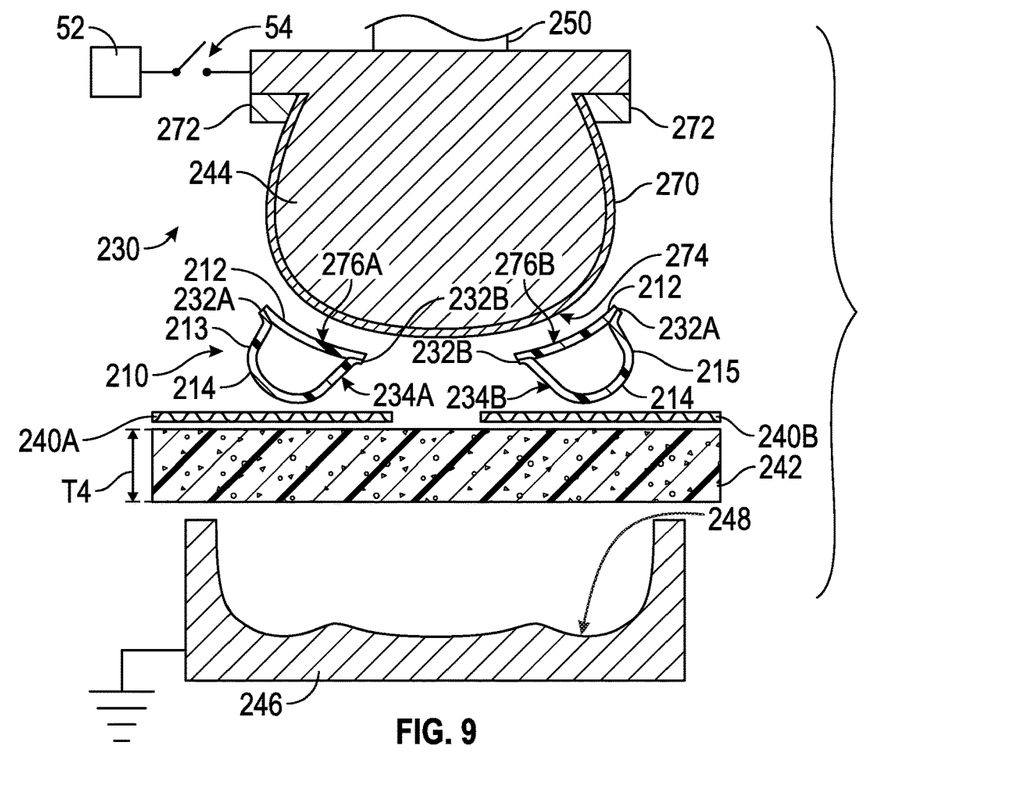
FIG. 9 is a schematic illustration in cross-sectional exploded view of an alternative embodiment of a tooling assembly, including wire mesh screens and a non-dielectric elastically-deformable component, and showing the bladder element of FIG. 7 taken at lines 9-9 in FIG. 7.
Figure 10:
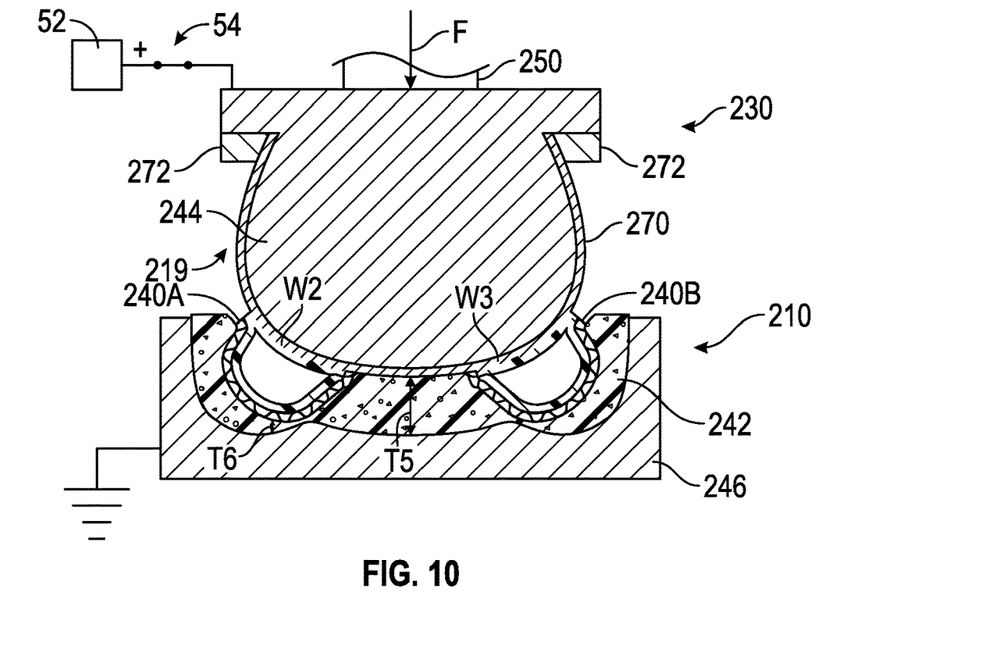
FIG. 10 is a schematic illustration of the tooling assembly of FIG. 9 welding the bladder element of FIG. 7.

FIG. 7 shows another bladder element 210 for an article of footwear 219 (shown in FIG. 10) that can be welded according to a method of manufacturing 300 of FIG. 8 using the tooling assembly 230 of FIGS. 9 and 10. The bladder element 210 forms a cavity 211 in the heel region between lateral 213 and medial 215 portions of the bladder element 210. The bladder element 210 is formed from a first sheet 212 and a second sheet 214 (shown in FIG. 9), which may be formed from any of the materials as described with respect to bladder element 10. The first sheet 212 forms the entire upper surface of the bladder element 210, and the second sheet 214 forms the entire lower surface of the bladder element 210. The first and second sheets 212, 214 are welded together at a peripheral flange 232A, and a flange 232B around the cavity 211. The tooling assembly 230 includes a first forming tool 244 and a second forming tool 246. The first forming tool 244 is movable toward and away from the second forming tool 246 such as by pneumatic or hydraulic pressure applied through a piston 250, resulting in force F. The first forming tool 244 is thus operable to move toward and away from the second forming tool 246. The second forming tool 246 may be fixed such that it is stationary. In other embodiments, both forming tools 244, 246 may be configured to move toward and away from one another, or the piston 250 could be connected to the second forming tool 246, and only the second forming tool 246 can be configured to move toward and away from the first forming tool 244.

The tooling assembly 230 also includes a first wire mesh screen 240A and a second wire mesh screen 240B, shown in FIGS. 9 and 10, and at least one non-dielectric, elastically-deformable component 242. Two separate wire mesh screens 240A, 240B are used in the embodiment of FIGS. 9 and 10. The use of multiple wire mesh screens may aid in welding an object with complex contours, such as the separate surfaces 234A, 234B of bladder element 210. Alternatively, only a single wire mesh screen extending under both lateral and medial portions 213, 215 could instead be used, or more than two wire mesh screens could be used. Similarly, although only one non-dielectric, elastically-deformable component 242 is used in the embodiment of FIGS. 9 and 10, multiple non-dielectric, elastically-deformable components could instead be used. The wire mesh screens 240A, 240B and non-dielectric, elastically-deformable component 242 are relatively soft tooling used in conjunction with the more rigid first and second forming tools 244, 246 of the tooling assembly 230 to enable a unique and reliable radio-frequency welding process described herein.

The wire mesh screens 240A, 240B can be any of a variety of materials capable of cooperating with the first forming tool 244 in causing an alternating magnetic field within the bladder element 210 when radio frequency energy is supplied to the first forming tool 244, which functions as an electrode. For example, the wire mesh screen 240 can be bronze, brass, copper, stainless steel, or alloys of any of these materials. Additionally, a range of mesh sizes for the wire mesh screens 240A, 240B may be suitable. For example, wire mesh screens 240A, 240B with 120 by 120 wires per square inch mesh and with 500 by 500 wires per square inch mesh have been determined to be suitable. The wire mesh screens 240A, 240B may have mesh sizes smaller or larger than these sizes, however. As shown in FIG. 9, the wire mesh screens 240A, 240B are generally flat when not subjected to compression between the forming tools 244, 246. The wire mesh screens 240A, 240B are configured with a wire thickness and mesh that enables the wire mesh screens 240A, 240B to easily flex to conform to the contoured outer surfaces 234A, 234B of the lateral and medial portions 213, 215 of the bladder element 210 when subjected to compression between the forming tools 244, 246, however.

The non-dielectric, elastically-deformable component 242 of FIG. 9 is of a material that is elastically and resiliently deformable. In other words, the component 242 has a compliance when subjected to compression by the forming tools 244, 246 that enables it to conform to the upper surface 248 of the lower forming tool 246, and to press the wire mesh components 240A, 240B against the lower surfaces 234A, 234B of the bladder element 210, while occupying the irregular volume between the wire mesh components 240A, 240B and the lower surfaces 234A, 234B, as shown in FIG. 10. The upper surface 248 of the lower forming tool 242 has some contoured areas generally corresponding with the contoured outer surfaces 234A, 234B of the bladder element 210. The contours of the forming tool 246 are not as severe as those of the bladder element 210, however, as the component 242 accommodates the differences in topography of the surfaces 248 and 234A, 234B. In fact, the surface 248 of the lower forming tool 246 could be completely flat.

The component 242 can be a generally rectangular shape, similar to component 42, with a substantially uniform thickness T4. The thickness T4 is chosen so that the component 242 will be compressed over its entire contact area with the second forming tool 246 and with the wire mesh components 240A, 240B. For example, some portions of the component 242 will be compressed to a thickness T5, and others will be compressed to an even smaller thickness T6, both of which are less than thickness T4.

When compressed, the material of the component 242 is such that the component 242 exerts a biasing force acting against the compressing forces as the component 242 is resiliently biased to its original shape and thickness T4 of FIG. 9. Suitable materials for the component 242 include but are not limited to polymeric foam, rubber, foamed rubber, and silicone butyl rubber. These suitable materials are non-dielectric, enabling the component 242 to insulate the second forming tool 246 from the effect of the radio frequency energy supplied to the first forming tool 244. Accordingly, the component 242 not only serves to force the wire mesh screens 240A, 240B to conform to the contoured surfaces 234A, 234B of the bladder element 210, but also ensures that the wire mesh components 240A, 240B will serve as the component that pairs with the first forming tool 244 to generate the alternating magnetic field.

A footwear upper 270 is clamped or otherwise secured to the first forming tool 244, such as with a clamp 272. The first forming tool 244 is shaped to mate to the footwear upper 270, similarly to a last. The outer surface 274 of the footwear upper 270 is a contoured surface to which contoured surfaces 276A, 276B of the upper sheet 212 are to be welded by radio frequency welding. Although the embodiment of FIGS. 9 and 10 shows a footwear upper 270 welded to a bladder element 210, in other embodiments, other components could be welded to the outer surfaces of the bladder element 210.

FIG. 10 shows the first forming tool 244 moved closer to the second forming tool 246, such as by application of pressure, including but not limited to pneumatic or hydraulic pressure through a piston 250, resulting in force F, as will be understood by those skilled in the art. The first forming tool 244 is thus operable to move toward and away from the second forming tool 246. The second forming tool 246 may be fixed such that it is stationary. In other embodiments, both forming tools 244, 246 may be configured to move toward and away from one another, or the piston 250 could be connected to the second forming tool 246, and only the second forming tool 246 may be configured to move toward and away from the first forming tool 244.

The first forming tool 244 is operatively connected to the power source 52 that supplies radio frequency energy to the first forming tool 244, such as when the switch 54 is closed. The first forming tool 244 is electrically conductive, such as a ferromagnetic material. When the first forming tool 244 is moved toward the second forming tool 246, the footwear upper 270 contacts the upper surfaces 276A, 276B of the lateral and medial portions 213, 215 of the first sheet 212, and the wire mesh tools 240A, 240B conform to and are in contact with the contoured surfaces 234A, 234B of the second sheet 214 as discussed herein.

The radio frequency energy supplied from the power source 52 creates an alternating magnetic field between the first forming tool 244 and the wire mesh components 240A, 240B and is therefore within the bladder element 210. The alternating magnetic field excites the dielectric material of the sheet 212, fusing the surfaces 276A, 276B to the footwear upper 270. Because the entire surfaces 276A, 276B are in contact with the footwear upper 270, and the contoured lower surfaces 234A, 234B of the second sheet 214 are in contact with the wire mesh components 240A, 240B, contoured welds W2, W3 are formed between a first component, the first sheet 212, and a second component, the footwear upper 270.

The flow diagram of FIG. 8 illustrates a method 300 of manufacturing components, such as the article of footwear 219 that includes the bladder element 210 and footwear upper 270. The method 300 may begin with step 302, inflating the bladder element 210, and then step 304, placing the footwear upper 270 on the first forming tool 244. The footwear upper 270 is secured to the first forming tool 244, such as with clamps 272.

In step 306, the non-dielectric, elastically-deformable component 242, the wire mesh components 240A, 240B, and the dielectric, contoured object (bladder element 210) are compressed between the first and second forming tools 244, 246. The method 300 then proceeds to step 308, supplying radio frequency energy to the first forming tool 244, thereby causing a radio frequency electromagnetic field between the first forming tool 244 and the wire mesh components 240A, 240B that results in the contoured welds W2, W3 of the bladder element 210 to the footwear upper 270. After a predetermined amount of time, or when some other predetermined parameter has been achieved, the method 300 moves to step 310 and the radio frequency energy is stopped, or, in other words, is no longer supplied to the first forming tool 244, such as by opening switch 54.

When the radio frequency energy is stopped, the compression of the non-dielectric, elastically-deformable component 242, the wire mesh components 240A, 240B, and the dielectric, contoured object (bladder element 210) is maintained by the first and second forming tools 244, 246 for at least a predetermined amount of time in step 312. During this time, the bladder element 210 cools, and pressure is released in step 314, allowing the first forming tool 244 to be moved away from the second forming tool 246. The welded contoured object, i.e., bladder element 210 with footwear upper 270 welded thereto, is then removed from between the forming tools 244, 246 in step 316. This may require unclamping the footwear upper 270 and removing it from the first forming tool 244.

Although the methods 100 and 300 are shown and described with respect to radio frequency welding of bladder elements 10, 210 for articles of footwear, the methods 100, 300 may be used for radio frequency welding of other dielectric objects requiring contoured welds.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An assembly for radio frequency welding of a dielectric, contoured object, the assembly comprising:
   a first forming tool and a second forming tool at least one of which is configured to be movable toward and away from the other;
   at least one non-dielectric, elastically-deformable component supported on the second forming tool;
   a first wire mesh component positioned and supported on the non-dielectric, elastically-deformable component;

a second wire mesh component separated from the first wire mesh component and positioned on the non-dielectric, elastically-deformable component independently of the first wire mesh component so that spacing between the first wire mesh component and the second wire mesh component is variable dependent upon the positioning of the second wire mesh component;

wherein the first forming tool, the first wire mesh component, and the second wire mesh component are configured to transmit radio frequency energy to a dielectric, contoured object, wherein the dielectric, contoured object is compressed between the first forming tool and the first and second wire mesh components by:

movement of said at least one of the forming tools toward the other forming tool; and the at least one non-dielectric, elastically-deformable component elastically deforming to distribute pressure of the first and second forming tools on the first wire mesh component and the second wire mesh component, the pressure flexing the first and second wire mesh components against the dielectric, contoured object to provide a first contoured weld of the dielectric, contoured object via the first wire mesh component and a second contoured weld of the dielectric, contoured object via the second wire mesh component.

2. The assembly of claim 1, wherein the at least one non-dielectric, elastically-deformable component is one of polymeric foam, foamed rubber, and butyl rubber.

3. The assembly of claim 1, wherein the first wire mesh component is one of bronze, brass, copper, and stainless steel, or alloys thereof.

4. The assembly of claim 1, wherein the first wire mesh component has from 120 by 120 wires per inch to 500 by 500 wires per inch.

5. The assembly of claim 1, wherein the at least one non-dielectric, elastically-deformable component has a surface supporting the first wire mesh component; and wherein the surface is substantially flat when not compressed between the first and second forming tools.

6. The assembly of claim 1, wherein the non-dielectric, elastically-deformable component is compliant and the first wire mesh component has a flexibility enabling the first wire mesh component to conform to a contoured surface when compressed under a pressure.

7. The assembly of claim 1, in combination with the dielectric, contoured object; and wherein the dielectric, contoured object is an inflatable bladder element that has at least partially thermoplastic polyurethane (TPU) sheets.

8. The assembly of claim 7 in combination with the dielectric, contoured object, and in further combination with a footwear upper; and wherein the first contoured weld is between the footwear upper and the inflatable bladder element.

9. The assembly of claim 1, wherein:

the second forming tool has a contoured surface; and the at least one non-dielectric, elastically-deformable component compresses against the contoured surface of the second forming tool when the at least one of the forming tools moves toward the other forming tool and the at least one non-dielectric, elastically-deformable component elastically deforms.

10. The assembly of claim 1, further comprising:

a piston configured to move the first forming tool toward the second forming tool when pneumatic or hydraulic pressure is applied through the piston.

11. The assembly of claim 1, further comprising:

a power source configured to supply radio frequency energy; and a switch disposed between the power source and the first forming tool and closable to operatively connect the power source to the first forming tool.

* * * * *